United States Patent [19]

Brown et al.

[11] 4,154,593

[45] May 15, 1979

[54] PROCESS FOR GRANULATING AMMONIUM PHOSPHATE CONTAINING FERTILIZERS

[75] Inventors: Marion L. Brown; Charles A. Johnson, III; Gerald L. Tucker, all of Yazoo City, Miss.

[73] Assignee: Mississippi Chemical Corporation, Yazoo City, Miss.

[21] Appl. No.: 769,323

[22] Filed: Feb. 16, 1977

Related U.S. Application Data

[62] Division of Ser. No. 718,161, Aug. 27, 1976, abandoned.

[51] Int. Cl.² ............................................. C05B 7/00
[52] U.S. Cl. .......................................... 71/33; 71/34; 71/43; 71/44; 71/64 DA; 422/189; 423/310
[58] Field of Search .................... 71/33, 34, 43, 64 D, 71/64 DA, 44, 53, 63; 423/309, 310, 312, 313; 23/259.1; 422/189

[56] References Cited

U.S. PATENT DOCUMENTS

| T904,033 | 11/1972 | Lee et al. | 71/34 |
|---|---|---|---|
| 3,005,687 | 10/1961 | McKnight | 71/43 |
| 3,165,395 | 1/1965 | McCamy | 71/43 |
| 3,384,470 | 5/1968 | Reynolds | 71/64 D |
| 3,540,874 | 11/1970 | Stinson | 71/34 |
| 3,563,723 | 2/1971 | Sackett | 71/34 |
| 4,017,588 | 4/1977 | Davidson | 71/43 |

FOREIGN PATENT DOCUMENTS

| 982341 | 6/1963 | United Kingdom | 71/34 |
|---|---|---|---|
| 1241181 | 7/1971 | United Kingdom | 71/33 |

OTHER PUBLICATIONS

Fertilizer Technology and Use, 1971, 1973, Second Printing, Soil Science Society of America, 381-385.
Manual on Fertilizer Manufacture, Sauchelli, 1963, Industry Publications Inc., 309-315.

Primary Examiner—Charles N. Hart
Assistant Examiner—Ernest G. Therkorn
Attorney, Agent, or Firm—Oblon, Fisher, Spivak, McClelland & Maier

[57] ABSTRACT

A process for granulating ammonium phosphate containing composition for use as a fertilizer which comprises feeding a slurry or melt of ammonium phosphate, wherein said slurry or melt is capable of further reaction with ammonia, into a kneading mill, feeding recycled particles from the subsequent classification and crushing procedure into said kneading mill, wherein the said slurry or melt added to the mill is from 5 to 95% wt. of the total slurry or melt, feeding ammonia into said mill to react with at least a portion of the reactable components of said slurry or melt, generating a heat of reaction, subjecting said mixture to a kneading action within said mill until the heat of reaction and the kneading action cause a repeated disposition of fertilizer material onto the solids and cause a repeated drying of said deposit, passing the product from said kneading mill into a rotary drum granulator, feeding additional ammonium phosphate containing slurry or melt to a said granulator in an amount of from 95% to 5% wt. based on the total slurry or melt, feeding additional amounts of ammonia to said granulator wherein at least a portion of the reactable components of said slurry or melt is reacted, giving off a heat of reaction, subjecting said mixture to a rotary action until said heat of reaction and tumbling action of the rotary granulator effects a further deposition of fertilizer material onto the solids, passing the product from said granulator into a dryer so as to remove excess water, subjecting said dried product to a classification apparatus so as to separate out particles which are outside the product size range, recycling at least a portion of said particle mixture to said kneading mill, and recovering said dried particles of product size. Commensurate apparatus is provided to perform said process.

15 Claims, 3 Drawing Figures

PROCESS FOR GRANULATING AMMONIUM PHOSPHATE CONTAINING FERTILIZERS

This is a division of application Ser. No. 718,161, filed Aug. 27, 1976, now abandoned.

BACKGROUND OF THE INVENTION

1. Field of the Invention

This invention relates generally to methods for granulating ammonium phosphate containing fertilizer compositions, and more particularly to the combination of a kneading mill and a granulator for achieving superior granulation to that heretofore possible by conventional techniques.

2. Description of the Prior Art

Granular mixed fertilizer is the term normally used to denote fertilizers which contain some or all of the ingredients: nitrogen, phosphorus and potash. The fertilizer raw materials and ingredients are normally turned into some form of granular product by a number of different processes which are collectively called granulation processes. The various granulation processes may differ in many aspects, but the general functions are the same.

In all commercial plants using the conventional processes, numerous major operating problems occur to shut the plant down or to run up maintenance costs and operating costs, and often result in inferior product quality.

In one type of conventional fertilizer process which uses a rotary drum as the granulator, ammonia is reacted with phosphoric acid and optionally with sulfuric acid, to produce a fluid mixture or a slurry. This process is often referred to as an ammonium phosphate based process. In this process, acid feeds (e.g., phosphoric acid, sulfuric acid, etc) are partially neutralized with the ammonia in a reactor, forming an aqueous slurry. The slurry is then combined with recycle material (consisting of dry dust or finely divided particles from the tail end of the plant) and dry raw material in the granulator in such a way as to cause agglomeration of the dust and liquid into round balls. This agglomeration step could be done in a rotary granulator drum, a pug mill, or some other device which will contact the liquid and the dry materials to cause them to ball up. Material is discharged from the granulator in the form of balls, lumps and fine and dusty undersized particles. Oversized particles are crushed by a grinder and recycled with the undersize back to the granulator as dust and fragments of granules.

In conventional granulation processes, dust and crushed oversized material and some product-sized material are recycled at a ratio of from six to ten parts of recycle to every part of raw material fed to the system. This means that for every ton of product which is produced, about 7 to 11 tons of total ingredients must be put through the granulator, dryer and screening equipment. The plant capacity and equipment sizes are governed mainly by the total amount of recycle which must be returned to the granulation steps. In conventional plants this requires very high investments in equipment for the sole purpose of recycling material back through the plant, granulating the material, redrying the material, rescreening and regrinding all of the oversize material. Thus, if a new process could be developed to reduce the amount of material recycled, a major reduction in equipment investments could be realized for new plants, and existing plants could realize an increase in capacity.

It was the aim of the present invention, therefore, to develop a process which would reduce the amount of recycle and at the same time produce granules which are harder and more uniform in size and shape than could heretofore be obtained. To do this, it was the aim of this invention to consistently produce a very high percentage of "on-size" product material at the exit of the granulation step. In conventional processes, only a small percentage of the material leaving the granulation step is product size and the remainder consists of large lumps and much dust. It was felt that if a high percentage of on-size granules could be consistently produced with few lumps and less dust, an increase in plant capacity and a decrease in production costs could be realized as well as obtaining a greatly improved product quality.

Essentially, two types of equipment are used today in the granulation procedure, a pug mill and a drum granulator. Neither of these units, however, have proven to provide satisfactory results, at least neither have been successfully used to achieve the aforementioned aims.

The type of granules produced in the drum granulator leaves much to be desired. They are normally rough and irregular in shape and are also quite porous. Due to this configuration, a large amount of surface area exists per given volume of granules. This can lead to serious caking problems when the fertilizer is stored, unless the material is dried to a very low moisture content. However, when dried to a sufficiently low moisture content, other problems arise; the rough, dry granules have low physical strength. During handling by transferring equipment, rough edges on the granules break down, causing the formation of dust and fines, which must be recycled and reprocessed. The presence of dust and fines contribute to three major problems: (A) promotion of caking in storage, (B) the necessity of using sophisticated pollution control equipment, and (C) increased handling steps. During handling at storage facilities distantly located from the production plants, the caked material or fines must be returned to the production plant for reprocessing. This greatly increases the cost of the finished product.

The present inventors have observed that the reason for the wide particle size distribution of granules produced in a drum granulator is that the function of the granulator is to cause agglomeration of small particles to form larger particles. The small particles are wetted and are brought into mutual contact. The intent is that the smaller particles will agglomerate in preference to the larger particles. In actuality, however, the wetted small particles are just as likely to combine in the granulator to form larger particles, as are two wetted larger particles likely to combine to form a still larger particle. When two larger particles combine however, the result is a lump of oversized material which will eventually have to be crushed and recycled. Moreover, in general, the degree of granulation is almost totally dependent upon the amount and composition of the liquid phase present in the granulator. If the liquid phase present at a particular point in the granulation is high, overgranulation will be the more likely result. If insufficient liquid phase is present, the smaller particles will not be able to stick together.

Product normally produced from a pug mill is quite similar to that produced in the drum granulator. Pug mill produced granules are also rough and irregular, causing the same problems discussed earlier. A major disadvantage of the use of a pug mill is that a higher recycle ratio (the ratio of recycle solid material to product produced) is required as compared with the use of a drum granulator. For a given equipment size the overall plant capacity is effectively reduced as the recycle is increased. When producing the usual phosphate fertilizer grades, the drum granulator normally operates at a recycle ratio of about 5:1 to 7:1. A pug mill, however, normally operates around 10:1 recycle ratio. In addition to reducing the plant capacity, a large amount of recycle increases the dryer loading. As a result, product moisture content is higher and the risk of caking in storage is greatly increased.

SUMMARY OF THE INVENTION

Accordingly, it is one object of this invention to provide a process for granulation of ammonium phosphate fertilizer whereby a superior granulated product, in terms of uniformity of size, hardness, moisture content and homogeneity can be obtained.

These and other objects will hereinafter become more readily apparent from the following description, have been attained by providing a process for granulating an ammonium phosphate containing composition, for use as a fertilizer, which comprises feeding a slurry or melt of ammonium phosphate, wherein said slurry or melt is capable of further reaction with ammonia, into a kneading mill, feeding recycled particles from the subsequent classification and crushing procedure into said kneading mill, wherein the said slurry of melt which is added to the mill is from 5 to 95% wt based on the weight of the total slurry or melt, feeding ammonia into said mill to react with at least a portion of the reactable components of said slurry or melt, generating a heat of reaction, subjecting said mixture to a kneading action within said mill until the heat of reaction and the kneading action cause a repeated deposition of fertilizer material onto the solids and cause a repeated drying of said deposit, passing the product from said kneading mill into a rotary drum granulator, feeding additional ammonium phosphate containing slurry or melt to said granulator in an amount of from 95% to 5% wt of the total slurry or melt, feeding additional amounts of ammonia to said granulator wherein at least a portion of the reactable components of said slurry or melt is reacted giving off a heat of reaction, subjecting said mixture to the action of said rotary drum granulator until said heat of reaction and tumbling action of the rotary granulator effects a further deposition of fertilizer material onto the solids, passing the product from said granulator into a dryer so as to remove excess water, subjecting said dried product to a classification apparatus so as to separate out particles which are outside the product size range, recycling at least a portion of said particle mixture to said kneading mill, and recovering said dried particles of product size.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
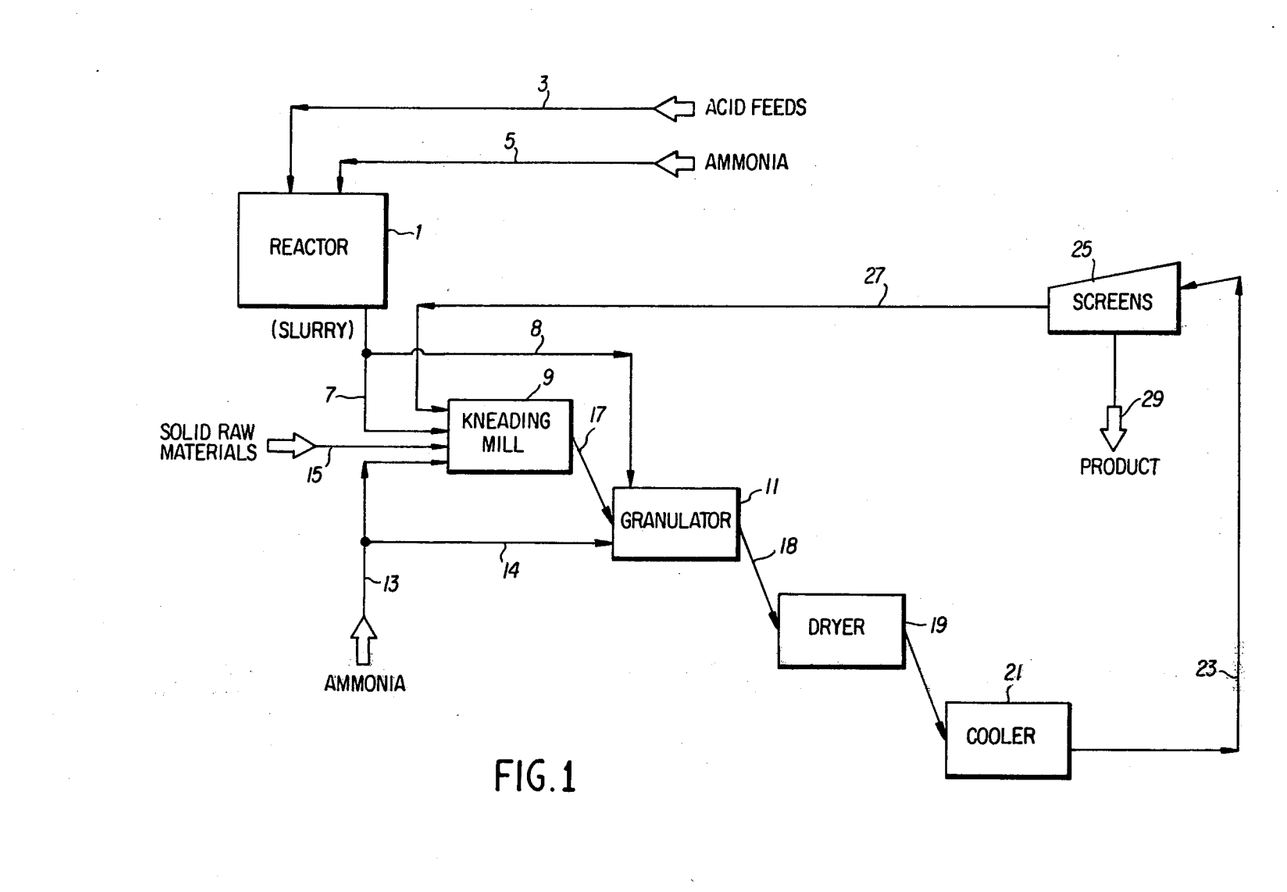
FIG. 1 is a schematic representation of the process of the present invention.

FIG. 1 is a flow sheet of the process of this invention. The acid and ammonia are fed to the neutralization reactor 1 through feed lines 3 and 5. The acid feed may be either phosphoric acid or a mixture of phosphoric acid and sulfuric acid. The ammonia may be either aqueous or anhydrous. The slurry or molten product from the neutralization reactor 1 is fed through line 7 and into the kneading mill 9 and granulator 11. A second quantity of ammonia, either aqueous or anhydrous, is fed through lines 13 and 14 into the kneading mill 9 and granulator 11. An optional secondary solids feed is brought through line 15 into the kneading mill 9. The product from the kneading mill 9 is passed into the granulator 11 through line 17. The granulator therefore receives the product from the kneading mill 9, and additional amounts of ammonia and slurry or melt from the neutralizer 1.

Following granulation in the granulator 11, the granulated product is passed through line 18 into the dryer 19 and then optionally through line 20 into cooler 21. The granules which may have been cooled are then classified by screening by being passed through line 23 into the classifier screens 25 which separate the end product sized granules from the oversized granules and fines. The oversized granules are then crushed in a crusher (not shown), combined with the fines and the mixture is recycled through line 27 to the kneading mill 9.

Product is recovered through line 29.

In accordance with this process, ammonium phosphate is first formed in a suitable neutralizer. This is accomplished by admixing phosphoric acid with ammonia. Optionally, sulfuric acid can be included in the mix and/or potash (potassium) to achieve variations in fertilizer grades. The phosphoric acid should preferably have a concentration of $P_2O_5$ of from 15 to 70%. In other words, some polyphosphoric acid can be tolerated. The ammonium phosphate formed is either di- or mono-ammonium phosphate or both.

Potash may be added in a solid form, or dissolved in the acid. Potash is conventioanlly used in the form of KCl or in the form of other potassium compounds such as $KNO_3$, $K_2SO_4$ or potassium phosphates. The quantity of potassium or potash which is used is calculated such that 0-50% $K_2O$ is present in the end product. When the potash is used, it can be introduced into the neutralizer, but is is preferable to introduce the potash into the second step of the procedure, namely, the kneading mill, especially if it is being introduced in the form of KCl. KCl can generate HCl which might cause difficulties in the neutralizer.

The neutralizer can be in the form of a single tank with appropriate acid and ammonia introduction spargers, such as that disclosed in applicants' prior U.S. Pat. No. 3,870,782 or with more conventional equipment. Instead of using a single tank, the neutralizer can be formed from multiple tanks placed in series or in parallel in order to minimize heat or handling problems, or to prevent losses. Further, the neutralizers can be pipe reactor types. The type of neutralizers used or course, is not critical. The neutralizer can be operated at temperatures of from 200° F. to 350° F. and at pressures of from vacuum to 30 atmospheres.

The ammonia used in the neutralizer can be in the form of anhydrous liquid, or saturated or superheated vapor, or aqueous ammonia.

The neutralizer is run at a mole ratio of $NH_3:H_3PO_4$ such that the resulting slurry or melt is capable of further reaction with ammonia. This further reaction can be a result of the fact that the slurry contains free acid, in which instance the mole ratio may be from 1.0 to 0.1 of $NH_3$ to total $H_3PO_4$, or because the form of the ammonium phosphate in the slurry is totally or partially monoammonium phosphate which, of course, is further reactable with ammonia to form diammonium phosphate. In the latter instance, the monoammonium phosphate content to diammonium phosphate content ranges from 100% mono and 0% di to 0% mono and 100% di. When the further reactability of the slurry is due to the presence of free acid, the free acid content can be excess sulfuric acid or phosphoric acid, or it can be a mixture of phosphoric and sulfuric acid.

As will be discussed below, it is important that the slurry or melt from the neutralizer be reactable with ammonia, since such further reaction will be required in the kneading mill and possibly in the granulator to generate a needed heat of reaction.

As the neutralization proceeds, some of the water will boil off. It is important that an appropriate quantity of water be taken off, since whatever water remaining at the completion of the neutralization reaction will enter the kneading mill. Too high a water content in the kneading mill will cause too great an amount of agglomeration of the nucleating particles which also could result in clogging of the processing equipment.

The water boiled off from the neutralizer should be sufficient so that the slurry or melt entering the kneading mill will contain from essentially no water (i.e., substantially a molten slurry) up to 40%wt. water. Preferably, the water content is from essentially zero (anhydrous condition) to 20%wt. Earlier attempts at granulation by the present invention involved the operation of the neutralizer such that the water content was relatively high, i.e., between 25-40%. This product was fed directly into the granulator. The problem with that technique, however, was that only a small build up on a portion of the particles could be obtained and it was necessary to repeatedly recycle the product into the granulator, build up a small deposit onto the particles, dry and then recycle to provide a further small deposit. Moreover, at the same time, that technique resulted in the formation of massive lumps which created problems. Another difficulty is that the process often required an unacceptably large number of recycles to achieve a sufficiently sized particle.

In the present invention, in contrast to those earlier attempts, the water content can be held to a much lower quantity, which means that less drying is required.

The product from the neutralizer is in the form of a slurry of solid particles in a mixture of water and/or acid and impurities or may be a molten mass. This product is fed into the second stage of the process, which is a kneading mill. Also fed into the kneading mill can be a second feed of solid raw material. Generally this second feed comprises materials such as potash, $CaCO_3$, dolomite, gypsum, or it can be a filler such as clay, dust, sea shells, sand or it can be trace elements such as compounds of Zn, Mg, Mn, B, Mb, S or the like. It might also be solid particles of ammonium phosphate, ammonium sulfate or the like.

The quantity of the second solid raw material fed to the kneading mill should be from 0 to 65% of the total feed, depending upon the exact NPK content and the desired recipe of the final product being produced. If the quantity of the solids in the slurry produced in the neutralizer stage is sufficiently large, and/or if the quantity of recycle stream is sufficiently large, no additional second solid raw material feed may be necessary. For instance in producing a fertilizer having an NPK of 18-46-0, no secondary solid feed would be necessary. A recycle stream of off-size particles separated from the ultimate product line, as will be discussed later, is also fed into the kneading mill. A suitable liquid phase content must be present during the initial kneading; said liquid phase being obtained by adding from 5% wt to 95% wt of the total slurry or melt to the kneading mill. Of course the particular solid/liquid phase content will depend upon the particular selection of materials added to the kneading mill. In general, sufficient liquid phase must be present to assure the build-up of the particles toward product size, such as by causing adherence of adjacent mutually contacting smaller particles, or by effecting dissolution and deposition of additional material onto the solids. Ammonia is also added to the kneading mill in amounts sufficient to react with some reactable components, i.e., the acid or monoammonium phosphate. The reaction of the ammonia gives off heat which causes drying of the liquid phase, thus causing additional solids to be layered onto the undissolved solid particles. Moreover, the liquid causes smaller particles to be adhered onto larger particles. The heat further has a drying effect so that the newly deposited layer is partially dried in situ in the mill. As the particles are tumbled through the kneading mill, the additional liquid phase is coated on outer portions of the particles and smaller particles deposited thereon, dried, relayered, redried, repeatedly. Heat can also be added to the system by the optional introduction of steam, hot water, or hot scrubber water to supplement the heat derived from the heat of reaction, and to adjust the liquid phase.

The result is that the particle size begins to build up by the layering effect, until the desired particle sizes are achieved. The layering effect can easily be observed in a cross-section of the finished particles. The cross-section will have the appearance of a central core with multiple successive thin layers thereon, much like a cut onion in appearance.

The kneading mill is a high energy input mill in which the particles are subjected to considerable shearing forces. The use of this type of mill is quite important for several reasons. It prevents the agglomeration of multiple large size particles which might otherwise be commonly coated and mutually adhered to form oversized particles.

One of the purposes of the kneading mill in this invention is to assure that only relatively small particles, often of dust size, will be permitted to adhere to the larger particles, so that relatively thin layers of small particles and deposited solids from adhering liquid will be formed onto a single or a small number of nuclear particles. The high shearing activity of the kneading mill will thus prevent particles which are too large, from mutually adhering, which would otherwise cause the development of structurally weak, oversized particles, whereby the heat of reaction of the ammonia and slurry reaction causes a repeated deposition of fertilizer materials from the liquid phase of the mixture onto the solid phase by drying the liquid phase. Also, the vigorous kneading action of the kneading mill assures thorough wetting of the solids. The most suitable type of kneading mill for the purposes of this invention is a pug mill, which is also sometimes referred to as a blunger.

A pug mill is a unit which consists of a longitudinal trough containing two parallel shafts with short, heavy-duty paddles. As the material moves gradually from one end of the trough to the other, the paddles cut and knead the material.

A pug mill is not the only type of mill which will provide a suitable action. Other types of milling equipment which would also be utilizable include a double agitation mixer, a continuous screw mixer, a double arm kneader, sigma blade mixer or the like.

A rotary granulator, e.g., a rotating drum as is commonly used in forming granular particles is not suitable for the purposes of this type of process since it lacks the shearing force capabilities of the above-mentioned mills. If the product from the neutralizer were fed into a rotary granulator, the solids would be wetted, but mutually contacting large wetted particles would tend to stick together due to the surface tension of the liquid, forming massive lumps and would tend to stay together long enough for deposition onto these lumps to begin, with the result of a more permanent bond. In the high shear mixers as described above, the shearing forces could tend to knock off the adhering particles so that a more uniform size distribution of particles is obtained.

The residence time of the material in the kneading mill is not particularly critical, however, the kneading action should be continued until the heat of reaction from the reaction of the ammonia with the reactable components of the slurry or melt causes repeated deposition of fertilizer materials onto the solids and effects at least a partial drying of the deposit thereby causing the aforediscussed layering effect.

The kneading mill is usually run at a temperature of from 110° F. to 234° F. at 1 atmosphere. The product removed from the kneading mill is generally quite uniform in size and has a particle size whereby preferably at least 30% of the particles has a mesh size of preferably between 14 mesh and 5 mesh. Interestingly, it was found that most of the oversized particles are only slightly oversized. The product produced in the kneading mill will tend to have a moisture content of no greater than 8%, and preferably no greater than 6%, except for the oversized particles which will tend to be quite moist in the interior of the particles.

The product is then passed into a rotary granulator or into a series of rotary granulators. Into each rotary granulator stage is introduced the product from the kneading mill, some additional ammonia and some additional slurry or melt from the neutralizer.

The total quantity of ammonia introduced through the entire procedure is 2% to 40% based on the product weight. The quantity is parceled out in the process in amounts of about 30% to 96% into the neutralizer, 35% to 2% into the kneading mill and 35% to 2% into the granulator.

The slurry coming from the neutralizer is divided in amounts of 5 to 95% weight in the kneading mill and 95 to 5% weight in the granulator. Preferably, the split between the kneading mill and granulator is 25 to 75% weight in the kneading mill and 75 to 25% weight in the granulator.

The recycle, which will be discussed below, is preferably fed entirely into the kneading mill, but could be divided between the kneading mill and the granulator in amounts of 100 to 25% in the kneading mill and 0 to 75% in the granulator.

The function of the granulator is to permit a continuation of the build-up of particle size and compacting of the granules until the desired end product size is attained. Following this operation, the particles will be large enough such that mutual adherence between contacting large particles is minimized. At this stage of particle size growth, continued build-up of the layers onto the particles is best accomplished under the less severe conditions of the rotary granulator.

The temperature of the granulator is usually about 110°–234° F., the same as in the kneading mill.

At the termination of granulation, the average moisture content of the particles tends to be a maximum of 6%, and preferably less than 4% or lower depending upon the particular grade of fertilizer being produced. The product from the granulator is fed into a drier where the residual water content is reduced.

Since the dryer is usually the most expensive piece of equipment, the lower the incoming moisture content, the smaller can be the dryer and/or the less energy input into the dryer is required. In fact, another of the distinct advantages of the procedure of this invention is the fact that the particles entering the dryer generally have a lower moisture content and the recycle is lower so that up to four times less water need be removed as compared with product obtained from a rotary granulator alone or a kneading mill alone. This means a heat load of only $\frac{1}{4}$ that of conventional procedures, which represents a considerable cost savings.

The drying temperature is usually 180°–260° F. at the exit end of the drier unit. In general, the dryer can be operated at a quite low temperature as compared to conventional processes which means that less decomposition of product occurs in the present invention. Usually quite a high percentage of diammonium phosphate entering the drier will be reduced to monoammonium phosphate which means that the present process not only reduces a loss of materials, but also helps to create a more favorable work area, since the continuous release of large amounts of $NH_3$ into the work atmosphere could be a health hazard.

The dryer used in this operation can be any conventional dryer, such as a cocurrent rotating drum type hot air dryer.

The product from the dryer can optionally be passed to a cooler, if desired, where the temperature is brought down to 100°–200° F.

The final operation is to pass the product through a classifier or a screen to separate the fines and any oversized particles from the desired end product sized particles. The desired end product should have a mesh size of between 5 and 14 mesh. Any oversized particles present, i.e., over 5 mesh are crushed, mixed with the fines, i.e., under 14 mesh, and recycled back to the kneading mill and/or the granulator.

One very unique and unexpected attribute of this invention is the fact that the ratio of recycle to new material is surprisingly, and, one must conclude, synergistically low. The term synergistic is used here because the combination of the kneading mill with the granulator does in fact provide synergistic results.

If a kneading mill alone is used to granulate the particles, e.g., if the slurry from the neutralizer is fed into the kneading mill and the mill is operated until the average particle size conforms to the desired end product size, the recycle ratio would be 10:1 or higher. The recycle ratio of a granulator when used alone, e.g., if the product from the neutralizer is fed directly into the granulator with the total granulation procedure occurring in a rotary granulator, the recycle ratio would be 5:1 to 7:1. The combination of the kneading mill with the rotary granulator would have been expected to have provided recycle ratios intermediate to that of the two. However, quite unexpectedly, the recycle ratio was found to be 2:1 to 4.5:1, i.e., lower than either unit used individually. This means major savings in industrial processing.

It should be here noted incidentally, that when discussing "recycle ratio", it is, of course, intended to mean that the recycle ratio required for the combination of kneading mill and rotary granulator is considerably lower than the require ratio of either unit used individually for a given grade of fertilizer.

The procedure of this invention quite definitely achieves the following advantages:

1. Material leaving the granulator contains a much higher percentage of product size material with very few large lumps or dusty fractions. Rather than the oversize being large lumps or balls, the oversize is mainly just large granules. In the plant operations, the percent of material which is on-size as it leaves the granulator is much higher than from conventional plants. This means that the dryer, cooler, screens, grinders, etc. do not have to be as large and there are fewer mechanical problems due to build up of the fines and lumps in recycle circuit elevators, grinders and on screens.
2. The material dries better and a drier product can be produced.
3. The composition is more uniform throughout the granules as far as nitrogen, potash and phosphate are concerned. This means the farmer can get more uniform application of plant nutrients to his crops. Also, granules are much smoother and rounder, having fewer projecting edges to break off in handling. The rounder granules flow better in farm distributors, a very important advantage to the farmer as it reduces his costs and gives him a more uniform distribution of fertilizer to the soil. Crop response is thus improved.
4. The hardness of the individual granules is much higher with the present process than with conventional processes. This is very desirable since it is capable of producing granules which are much harder to break when being handled by shipping and storage equipment. In normal shipping and storage systems, the conventional granulation material suffers considerable breakage to form large amounts of dust and fines as it is handled. This presents a major problem in that it causes the dust to spread across the countryside. It is very uneconomical for the storage facilities which are located remote from granulation plants because it is necessary to reprocess or dispose of the dust and off-grade material at a considerable financial loss.

The harder granules also store with less caking under varying weather conditions. At the test data presented later will show, there is a marked improvement in the granule hardness produced by the present process over that produced by the conventional methods.

The process of this invention provides for certain other exceptional advantages as compared with conventional granulation processes. For instance, the moisture content required for granulation is considerably less than that required in conventional processes. For any given production rate, as moisture requirements for granulation increase, the dryer size and heating load must be increased. It is, therefore, an advantage to reduce the moisture required for granulation.

When granulating 18-46-0 and at a recycle ratio of 3.1:1, it was possible to run well with a granulator moisture of only 2.4 to 3.5% with the present process. On the other hand, with conventional processes, the recycle ratio and moisture content had to be run at 6:1 and 6%, respectively.

This invention further provides an advantageous production rate as compared with conventional procedures.

Another most important advantage for the new process is that it allows the plant to run with a uniform product rate without the necessity of shutting off the feeds. With conventional processes, it is necessary to shut the feeds off very frequently to reduce the amount of fines or oversize which has accumulated in the recycle system. Since cutting off the raw material feeds results in less total production in any given 24 hour period, another major advantage of this invention is the ability to operate the plant without disruption to plant operations.

Another advantage of the present process is the degree of uniformity of product. With the conventional process, the product contained a wide range of particle sizes and a high percentage of small and large particles. The fines and lumps have to be screened out when the product was shipped from storage, and returned to the plant, thus representing a loss of a portion of the plant capacity.

With the conventional process, it had been standard practice for many years to use coarse grade potash to increase capacity, but this is a very expensive way of getting extra production because the coarse potash costs much more than the fine grade potash. The present process, however, can permit the use of fine grade potash while still being able to operate the plant at the higher rates. Since the present process combines either fine or coarse potash into the product granules in a much more homogeneous manner and coats the potash particles with the ammonium phosphates, a more uniform distribution of the potash nutrient content can be obtained throughout the entire production. Thus, the farmer can obtain a more even distribution of plant nutrients to his crops.

When using coarse potash in the conventional process, the potash particles did not get an adequate coating of ammonium phosphate/ammonium sulfate slurry. Therefore, the production resembled a physical non-homogeneous mixture. The conventional process also failed to incorporate fine potash into granules in the homogeneous manner obtained by the present process. Table 1 compares the present process with the conventional process to show the particle size distribution at the granulator discharge when using fine potash versus coarse potash. The data show that the present process provide more even distribution of potash through each granule size when using either fine or coarse potash.

TABLE 1

Typical Particle Size Distribution from Granulator Discharge
PERCENT RETAINED ON SCREEN MESH SIZES

| Screen Mesh | When Using Fine Grade Potash | | When Using Coarse Grain Potash | |
|---|---|---|---|---|
| | New Process | Conventional Process | New Process | Conventional Process |
| +6 | 23.5 | 48.5 | 28.5 | 46.5 |
| −6 + 8 | 26.0 | 10.0 | 36.5 | 19.5 |
| −8 + 10 | 19.5 | 7.5 | 15.0 | 9.5 |
| −10 + 12 | 13.5 | 11.5 | 10.5 | 9.5 |
| −12 + 16 | 13.5 | 13.5 | 7.0 | 12.5 |
| −16 | 4.5 | 9.5 | 2.5 | 2.5 |

Also, the data show that the conventional process concentrates too much potash in the +6 oversize fraction and in the −12 and −16 fractions. When using fine potash, the present process incorporated 60% of the potash in the −6 to +12 product size fraction; the conventional process only incorporated 29%. When using coarse potash, the present process incorporated 62% in the −6 to +12 product size; the conventional process incorporated only 38.5%.

Figure 2:
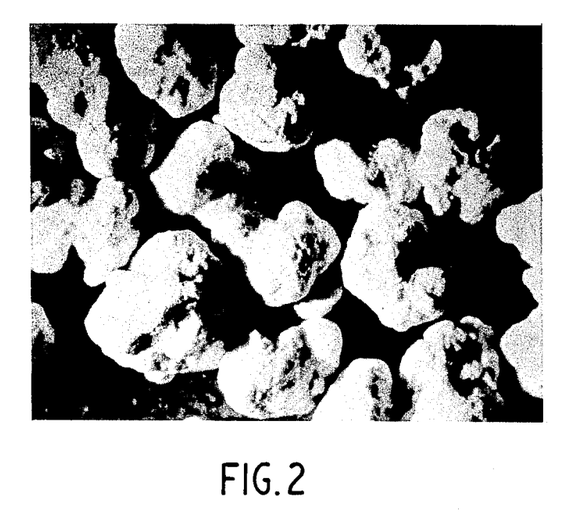
FIG. 2 is a photomicrograph of granules of 18-46-0 made by a conventional granulation process.
Figure 3:
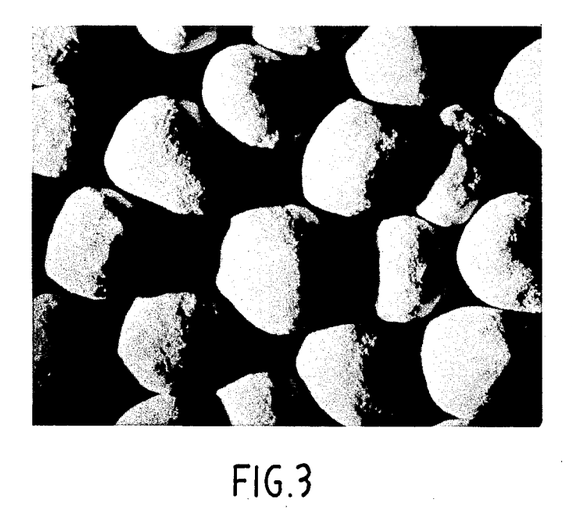
FIG. 3 is a photomicrograph of granules of 18-46-0 made by the present invention.

The present process also produces a layered type granule, which is much harder and contains fewer pores (or hollows). A combination of extra hardness and lower porosity greatly improves the handling and storage characteristics of the product. The harder granules are less subject to breakage and caking (lumping up in storage). FIGS. 2 and 3 show a comparison of 18-46-0 fertilizer prepared by the conventional granulation process (FIG. 2) and of the combination of pug mill and granulation (FIG. 3) of the present invention. One can readily observe the rough "popcorn" effect of the conventional particles as compared with the smoothness of the product of this invention.

Porous granules allow moisture to migrate into and out of the granules. When the atmosphere surrounding the granules is humid, moisture will enter the pores and be absorbed by the hygroscopic fertilizer ingredients. The moisture dissolves some fertilizer. Then as the atmosphere surrounding the granules becomes lower in humidity, the moisture will leave the granules through the pores. This causes recrystallization of the soluble fertilizer ingredients. The recrystallized material in one granule will cement itself to the recrystallized material in granules which are touching. This results in many granules cementing together to form many large lumps, a phenomenon called "caking". It is, therefore, very advantageous to eliminate as much of the porosity as possible.

To compare granule hardness, a test was developed to determine the hardness of individual granules. Hardness was defined in terms of kilograms per square centimeter required to crush a single granule which has been selected from the −6 to +8 mesh screen size range. An average of 10 randomly selected granules in each batch of samples is reported as the granule crushing strength.

The results in Table II compare the hardness obtained from the present process with that obtained from the conventional process. The figures reported are the average of 3 separate representative test runs made for each different grade.

TABLE II

GRANULE CRUSH STRENGTH, Kg/Cm$^2$

| Fertilizer Grade | Conventional Process | Present Process |
|---|---|---|
| 13-13-13 | 59 | 104 |
| 18-46-0 | 105 | 134 |

A moderate difference in the crush strength represents a very great difference in granule hardness.

The new process eliminates most of the pores, as indicated by the bulk density. The higher the bulk density, the fewer the pores. A small difference in bulk density represents a large difference in the amount of pores. The data in Table III compares the bulk densities:

TABLE III

Bulk Densities of Fertilizer Product (lbs. per cubic foot)

| Grade | Conventional Process | Present Process |
|---|---|---|
| 13-13-13 | 58.0 | 62.5 |

While producing 13-13-13, with the conventional processes, it was necessary to run the recycle ratio at 6:1, whereas with the present process, it was possible to sustain a 3:1 ratio in a lengthy test run. In the conventional processes, lowering the recycle ratio below 6:1 caused the product granules to degenerate markedly in quality. When combining the rotary granulator and pug mill in the present process, it was possible to run the recycle ratio at 3:1 and lower while actually gaining a product quality improvement, an unexpected finding.

The present process can be successfully operated over a much wider range of operating variables than the conventional process, making it less susceptible to changes in slurry moisture content, granulating temperature, recycle ratio and other process variables. The conventional processes are easily upset by slight changes in the operating conditions, requiring plant feeds to be shut off until the upset can be corrected. This results in a loss of on-stream time, thus causing a marked increase in operating costs and a substantial reduction in annual production and production of poor quality product. The present process has a much higher on-stream time because it can tolerate much wider variations in the operating variables without granulation being drastically affected.

The present process has the ability to run at a higher granulation temperature, which makes the granules much harder. In granulation, as the temperature is increased, the amount of fertilizer salts in solution (called liquid phase) increases while the moisture content is maintained constant. To control the granulation process, it is essential that the amount of liquid phase be carefully controlled. The amount of liquid phase is a function of temperature and the amount of moisture present in the granulator. Therefore, if the granulation temperature is raised, it is necessary to lower the moisture content in the granulator so as to maintain the same amount of solution phase. If the granulation temperature is raised and the moisture content is not lowered, the granulation system becomes too sticky and the granulation circuit will become a mass of lumps and oversize granules. With the conventional process, the moisture content could not be reduced when the granulation temperature was raised. With the present process however, it is possible to raise the granulation temperature while lowering the moisture content. This results in maintaining the same liquid phase and provides excellent granulation. As a result, granule hardness is increased sharply. Again, this points to the advantages of the present process.

When the recycle ratio in the conventional process was lowered below about 6:1, the plant began to experience problems and the granulation circuit became full of lumps and fines. Also, product quality and hardness deteriorated rapidly. This means that the present process can tolerate wide fluctuations in the recycle ratio without the process or product quality being upset, whereas the conventional process does not have this flexibility.

It is important that fertilizer nutrients such as $P_2O_5$ and $K_2O$ be uniformly distributed throughout each particle size, especially in the $-6$ to $+12$ mesh range, so as to produce homogeneous granules. The present process achieves more evenly distributed nutrients as compared with the conventional process.

COMPARISON EXAMPLE 1

A "drum-only" granulation process was operated according to the conditions stated below. The purpose was for product comparison with that of the present invention.

| Fertilizer Grade | 13-13-13 |
|---|---|
| Slurry Split | None |
| Ammonia Split | None |
| Slurry Conditions: | |
| Sp. Gr. - 1.50 | |
| Mole Ratio ($NH_3$:$H_3PO_4$) - 0.6 | |
| % Moisture - 24.1 | |
| % Moisture in "drum-38 - 2.2 | |

Resulting granules were poorly shaped with many pores, having a typical crushing strength of 55–60 $Kg/cm^2$. The required recycle ratio was 6:1. Potash distribution in the various granule sizes was:

| Mesh - | +6 | +8 | +10 | +12 | +14 | -14 |
|---|---|---|---|---|---|---|
| % $K_2O$ | 10.2 | 8.9 | 8.0 | 18.4 | 20.8 | 12.6 |

EXAMPLE 1

A granulation process described in the present invention (pugmill/drum combination) was tested under conditions listed below:

| Fertilizer Grade | - 13-13-13 |
|---|---|
| Slurry Split | - 50% pugmill/50% drum |
| Ammonia Split | - 50% pugmill/50% drum |
| Slurry Conditions: | |
| Sp. Gr. | - 1.47 |
| Mole Ratio | - 0.6 |
| % Moisture | - 14.9 |
| Granulation Temperature | - 197° F. |
| Granulation Moisture | - 1.0% |

Resulting granules were round and smooth with no visible pores. A recycle ratio of 2.4:1 was required and a typical crushing strength for the granules was 100–110 $Kg/cm^2$.

Potash distribution in the various granule size was:

| Mesh - | +6 | +8 | +10 | +12 | +14 | -14 |
|---|---|---|---|---|---|---|
| % $K_2O$ | 13.7 | 12.9 | 12.4 | 12.4 | 13.0 | 15.2 |

EXAMPLE 2

A granulation process described in the present invention was tested under the following conditions:

| Fertilizer Grade | -18-46-0 |
|---|---|
| Slurry Split | - 75% pugmill/25% drum |
| Ammonia Split | - 75/25 |
| Slurry Conditions: | |
| Mole Ratio | - 1.51 |
| Granulation Temperature | - 140° F. |
| Granulation Moisture | - 1.2% |

Exceptionally round, smooth granules were obtained at a recycle ratio of 3.1:1 with a typical crushing strength of 130–140 $Kg/cm^2$.

EXAMPLE 3

Another test series was conducted on grade 13-13-13. The equipment arrangement described in Example 1 was used. Slurry from the neutralizer at 19% moisture was divided on a 40%/60% split to the pugmill (556 #/hr) and the drum granulator (834 #/hr). Ammonia was distributed on the same basis.

All recycle material (7200 #/hr) was fed to the pugmill. This represents a recycle ratio of 3.6:1, since production rate was controlled at 1 ton/hr. Product granules were of good quality, both in appearance and crushing strength (90+ $Kg/cm^2$).

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for granulating an ammonium phosphate containing composition for use as a fertilizer which comprises:
    feeding a slurry or melt of ammonium phosphate containing less than 20 wt.% water, wherein said slurry or melt is capable of further reaction with ammonia, into a kneading mill,
    feeding recycled particles from the subsequent classification and crushing procedure into said kneading mill at a recycle ratio of 2:1 to 4.5:1,
    wherein the said slurry or melt added to the mill is from 25 to 75% wt based on the total slurry or melt which is to be granulated,
    feeding ammonia into said mill to react with at least a portion of the reactable components of said slurry or melt, generating a heat of reaction,
    subjecting said mixture to a kneading action within said mill until the heat of reaction and the kneading action cause a repeated deposition of fertilizer material onto the solids and cause a repeated drying of said deposit,
    passing the product from said kneading mill into a rotary drum granulator,
    feeding additional ammonium phosphate containing slurry or melt having a water content of less than 20 wt.% to said granulator in an amount of from 75 to 25% based on the total slurry or melt which is to be granulated, feeding additional amounts of ammonia to said granulator wherein at least a portion of the reactable components of said slurry or melt is reacted giving off a heat of reaction, subjecting said mixture to a rotary action until said heat of reaction and tumbling action of the rotary granulator effects a further deposition of fertilizer material onto the solids, passing the product from said granulator into a drier so as to remove excess water, subjecting said dried product to a classification apparatus so as to separate out particles which are outside the product size range, recycling at least a portion of said particle mixture to said kneading mill, and recovering said dried particles of product size.

2. The process of claim 1, wherein said slurry or melt is formed by reacting a sufficient amount of phosphoric acid having a $P_2O_5$ content of 15 to 70% wt with ammonia to form monoammonium phosphate with a mole ratio of $NH_3:H_3PO_4$ of from 1.0 to 0.1.

3. The process of claim 2, wherein the total quantity of ammonia added is 2% to 40%, based on the weight of the product.

4. The process of claim 3, wherein 30 to 96% of said ammonia is added to effect the neutralization of the phosphoric acid, and wherein 35 to 2% of said ammonia is added to said kneading mill and 35 to 2% of said ammonia is added to said granulator.

5. The process of claim 1, wherein said slurry or melt is formed by reacting a sufficient amount of phosphoric acid having a $P_2O_5$ content of 15 to 70% wt with ammonia to form monoammonium phosphate and diammonium phosphate in an amount of between 100% MAP and 0% DAP, to 0% MAP and 100% DAP.

6. The process of claim 1, wherein potash is fed to said kneading mill in an amount such that up to 50% $K_2O$ in the form of a potassium compound selected from the group consisting of KCl, $K_2SO_4$ and potassium phosphates.

7. The process of claim 1, wherein a solid filler is introduced into said kneading mill.

8. The process of claim 7, wherein said solid filler is potash, dolomite, $CaCO_3$, gypsum, clay, dust, sea shells, sand, compounds of Zn, Mg, Mn, B, Mb or S or mixtures thereof.

9. The process of claim 1, wherein steam, hot water or hot scrubber water is added to said kneading mill.

10. The process of claim 1, wherein said kneading mill is a pug mill.

11. The process of claim 1, wherein the temperature within said kneading mill and said granulator is from 110° F. to 234° F.

12. The process of claim 11, wherein 100 to 25% wt of the recycled particles are fed to said kneading mill and 0 to 75% of said particles are fed to said granulator.

13. The process of claim 1, wherein oversized particles from said classification apparatus are crushed, combined with undersized particles from said classification apparatus and said mixture is recycled to said kneading mill.

14. The process of claim 13, wherein a portion of said recycle mixture is recycled to said granulator.

15. A process for granulating an ammoinium phosphate containing composition for use as a fertilizer which comprises:

feeding a slurry or melt of ammonium phosphate containing less than 20 wt.% water and produced by reacting phosphoric acid having a $P_2O_5$ of 15–70% with ammonia, wherein said slurry or melt is capable of further reaction with ammonia, into a pug mill, feeding potash to said pug mill in an amount of up to 50% $K_2O$, feeding recycled particles from the subsequent classification and crushing procedure into said pug mill at a recycle ratio of 2:1 to 4.5:1, wherein said slurry or melt added to the mill is from 25 to 75% wt based on the total slurry or melt used in the granulators, feeding ammonia into said mill to react with at least a portion of the reactable components of said slurry or melt, generating a heat of reaction, subjecting said mixture to a kneading action within said mill until the heat of reaction and the kneading action cause a repeated deposition of fertilizer material into the solids and cause a repeated drying of said deposit, passing the product from said pug mill into a rotary drum granulator, feeding additonal ammonium phosphate containing slurry or melt having a water content of less than 20 wt.% to said granulator in an amount of from 75 to 25% based on the total slurry or melt, feeding additional amounts of ammonia to said granulator wherein at least a portion of the reactable components of said slurry or melt is reacted giving off a heat or reaction, subjecting said mixture to the action of said rotary drum granulator until said heat of reaction and tumbling action of the rotary granulator effects a further deposition of fertilizer material onto the solids, passing the product from said granulator into a dryer so as to remove excess water, subjecting said dried product to a classification apparatus so as to separate out particles which are outside the product size range, recycling at least a portion of said particle mixture to said pug mill and recovering said dried particles of product size of 14 to 5 mesh.

* * * * *

UNITED STATES PATENT AND TRADEMARK OFFICE
CERTIFICATE OF CORRECTION

PATENT NO. : 4,154,593

DATED : May 15, 1979

INVENTOR(S) : Marion L. Brown, et al

It is certified that error appears in the above—identified patent and that said Letters Patent is hereby corrected as shown below:

In the Abstract:

Line 2, delete "composition" insert --compositions--
Line 7, delete "the" insert --a--
Line 14, delete "disposition" insert --deposition--
Line 18, delete "a"

Column 1, line 68, delete "investments" insert --investment--
Column 4, line 46, delete "conventioanlly" insert
   --conventionally--
Column 4, line 52, delete "is" first occurrence insert --it--
Column 4, line 65, delete "or" insert --of--
Column 7, line 16, after "particles" insert --,--
Column 8, line 55, after "mesh" insert --,--
Column 9, line 15, delete "require" insert --required--

Column 10, line 67, delete "provide" insert --provides--
Column 11, line 66, delete "Kg/Cm$^2$" insert --Kg/cm$^2$--
Column 13, line 68, delete "size" insert --sizes--
Column 15, line 42, after "50%" insert --is--

UNITED STATES PATENT AND TRADEMARK OFFICE
CERTIFICATE OF CORRECTION

PATENT NO. : 4,154,593

DATED : May 15, 1979

INVENTOR(S) : Marion L. Brown, et al

It is certified that error appears in the above—identified patent and that said Letters Patent is hereby corrected as shown below:

```
Column 16, line 11, delete "ammoinium" insert --ammonium--
Column 16, line 45, delete "or" insert --of--
Column 3, line 21, after "objects" insert --as--
Column 12, line 2, delete "Kg/Cm²" and insert --Kg/cm²--
```

Signed and Sealed this

Tenth Day of February 1981

[SEAL]

Attest:

RENE D. TEGTMEYER

Attesting Officer     Acting Commissioner of Patents and Trademarks